Dec. 30, 1969 E. J. H. DE RAEDT ET AL 3,487,172

AUTOMATIC TELECOMMUNICATION SWITCHING SYSTEM

Filed June 22, 1966 5 Sheets-Sheet 3

AUTOMATIC TELECOMMUNICATION SWITCHING SYSTEM

AUTOMATIC TELECOMMUNICATION SWITCHING SYSTEM 3,487,172

AUTOMATIC TELECOMMUNICATION SWITCHING SYSTEM

Egide Jacob Hendrik De Raedt, Hoboken, Georges Pieter Adolf Mathildis De Bruyne, Lebbeke, and Sylvère Jules Staelens, Antwerp, Belgium, assignors to International Standard Electric Corporation, New York, N.Y., a corporation of Delaware Filed June 22, 1966, Ser. No. 559,579
Claims priority, application Netherlands, June 29, 1965, 6508310
Int. Cl. H04m 3/00
U.S. Cl. 179—18 16 Claims

ABSTRACT OF THE DISCLOSURE

An automatic telecommunication switching system is proposed using conventional identification equipment and special circuits to interconnect the identification equipment to an accounting center. A plurality of identifying loops are partially established and then completed in rapid succession. A two-coordinate lock-out circuit is used to prevent the establishment of more than one of said loops at a time.

This invention relates to an automatic telecommunication switching system comprising stations, automatic switching means for establishing connections between calling and called stations, at least one identifier circuit capable of identifying any calling station, means for generating an identifying signal and connection means capable of establishing a closed identifying loop including said identifier circuit and part of a connection established by said switching means and leading to a calling station and of connecting said generating means to said loop in order to perform an identifying operation, and means for transmitting the identity stored in said identifier circuit after such an operation to an identifying center.

Such a system is already known from the article "Automatic Number Identification: Outpulsers and Identifiers" by C. H. Dagnall, Jr. published in the Bell Laboratories Record of March 1961. This known system is however only adapted for the automatic accounting of toll calls. For automatically accounting local calls a meter has to be associated to each station so that considerable material is required as well as much personnel and time for regularly booking the state of these meters. On the other hand, in case of toll calls, the identify is transmitted to the identifying or accounting center via a register and at least through part of the connection established by the switching means between this register and the called station. In case of local calls such a connection does not exist.

It is therefore an object of the present invention to provide an automatic telecommunication switching system of the above type which is particularly, but not exclusively, adapted to the automatic accounting of local calls and which permits the elimination of the above meters.

The invention is based on the insight that the single identifier circuit used for toll calls may be sufficient to identify the local calls notwithstanding the fact that local calls are usually far more numerous than toll calls.

The present automatic switching system is characterized in that said transmission means are connected to said identifying center through means distinct from said con nections between calling and called stations.

Another characteristic of the present automatic switching system is that said transmission means include a plurality of transmission circuits each permanently connected to said identifying center and that said connection means include lock-out means to prevent more than one of said loops to be simultaneously established.

Still another characteristic of the present automatic switching system is that said connecting means are able to establish a closed loop including a said transmission circuit capable of being connected to said generating means, by connecting said transmission circuit, one the one hand, to the end of said partial connection away from said calling station and, on the other hand, to said identifier circuit which is permanently coupled to said stations.

Still another characteristic of the present automatic switching system is that said connecting means are able to simultaneously establish a plurality of partial loops each including a said transmission circuit, a said partial connection and said identifier circuit and are able to complete each partially established loop one at a time by interconnecting said identifier circuit and the transmission circuit included in this partially established loop.

Yet another characteristic of the present automatic switching system is that said connecting means include first connecting elements, i.e. single contact reed relays, adapted to complete a said partially established loop at a speed which is substantially higher than that at which second connecting elements included in said connecting means establish such a partial loop.

Due to the two last mentioned characteristics only a small number of transmission circuits is needed since, after an identification operation has been performed another one is started almost immediately.

According to a second aspect, the present invention also relates to a two-coordinate lock-out relay circuit of the type comprising a two-coordinate lock-out relay circuit comprising a plurality of relays and such that no set of two relays having a common coordinate can constitute a stable operated combination, each set of relays associated with a same coordinate in one direction having a locking circuit and being associated with a common relay which is so connected that it changes its condition subsequently to the operation of any associated relay, thereby disabling the operating circuits of said associated relays, only one of which is held operated through said locking circuit constituted by a priority chain formed by series connected first contacts of the relays associated in said one direction, and the relays having the same coordinate in the other direction being operated through second contacts of the other relays having said same coordinate in said other direction. The present lock-out circuit is characterised in that said common relay is normally operated through said locking circuit the first contacts of which are break contacts and that said common relay releases subsequently to the operation of any associated relay.

According to a third aspect, the invention also concerns an identification circuit including a plurality of circuits subdivided in groups in at least two different ways, bistate devices operable in response to one or more of said circuits being in a calling condition to characterize one particular calling circuit, sets of bistate devices being provided for each subdivision into groups and the bistate devices pertaining to different sets being operated one after the other. This circuit is characterized in that in each set, the bistate devices are simultaneously driven toward the condition characterizing a calling circuit.

The above mentioned and other objects and characteristics of the invention, and the best manner of attaining them will be better understood from the following detailed description of an embodiment to be read in conjunction with the accompanying drawings wherein.

Figure 1:
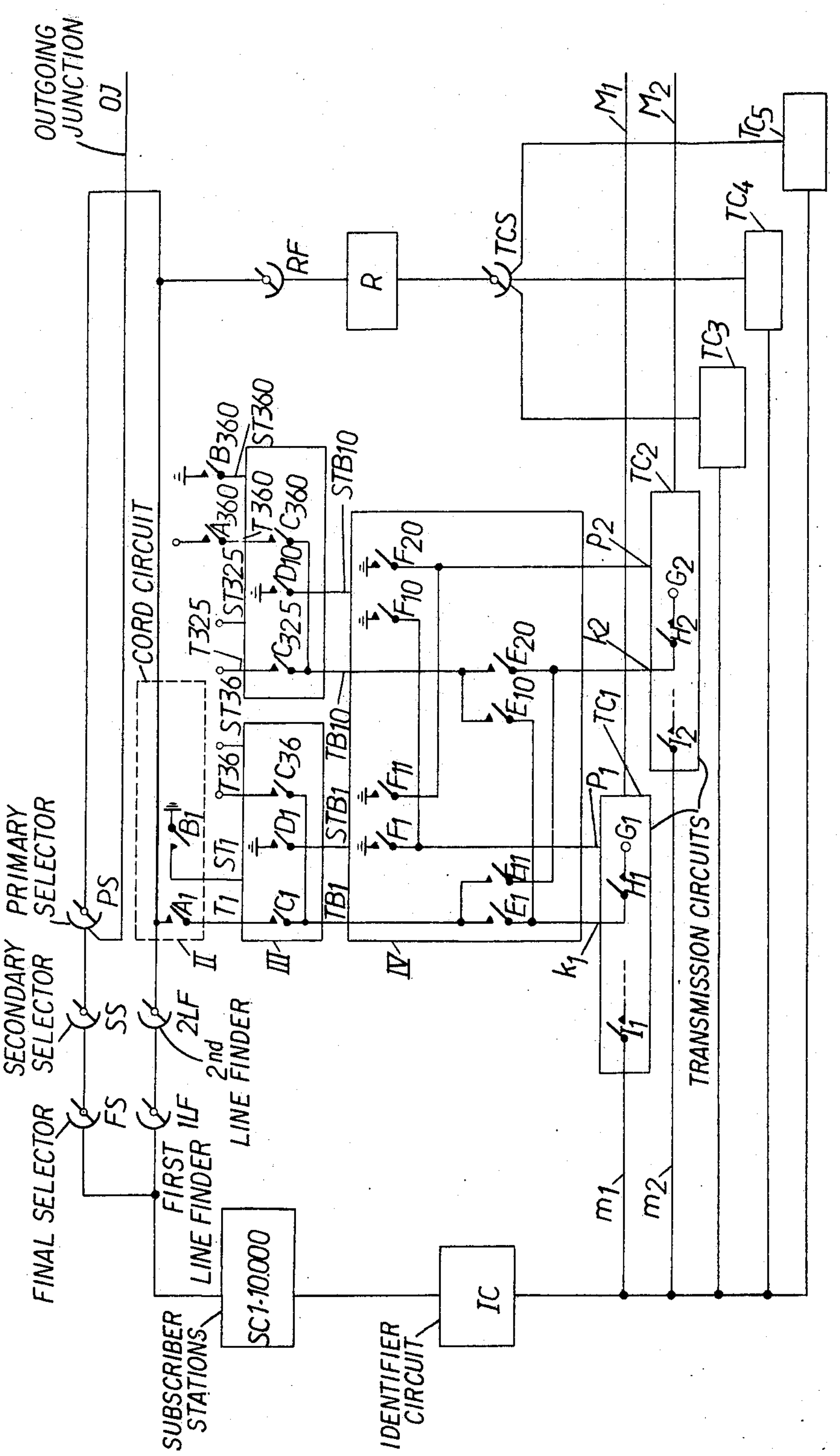
FIG. 1 is a schematic view of an automatic switching system according to the invention.

Principally referring to FIG. 1, and without considering the right hand part thereof, the automatic telecommunication switching system shown comprises 10,000 subscriber stations SC1–10,000. A calling and a called station may be interconnected in a classical way, which is therefore not described in detail, via a first line finder 1LF, a second line finder 2LF, a primary selector PS, and an outgoing junction OJ and switching means in another exchange in case of a toll call, or a secondary selector SS and a final selector FS in case of local call.

This switching system includes 360 cord circuits, such as II, extending between the second line finders 2LF and the primary selectors PS and capable of being connected to any one of two transmission circuits TC1 and TC2 via three series connected contacts, one in each of the groups A1–360, C1–360 and E1–20. It should be noted that these contacts, such as A1, as well as those mentioned hereinafter are in general contact groups, but will always be referred to as contacts for reasons of simplicity. Each cord circuit includes a first signal wire T1–360, which is connected to this cord circuit via a contact A1–360 when message accounting must be performed, and a first start lead ST1–360 which is grounded through a contact B1–360 in the same circumstances. The 360 first start leads ST1–360 are distributed over 10 groups of each 36 start leads, the start leads of each such group being connected to a circuit such as the one indicated by III. This circuit includes the contacts C1–36 and D1 and a first lock-out arrangement (not shown) connected to the first start leads ST1–36. This lockout arrangement is adapted to select a single one among the 36 cord circuits, when one or more or all of associated first start leads ST1–36 are activated, and to determine the identity of this cord circuit. After this identity has been determined the corresponding contact C1–36 is closed so that the corresponding cord circuit is connected to the second signal wire TB1 via a contact A1–36 and a contact C1–36. Also a ground is applied to the second start lead STB1 by the closure of make contact D1, this lead being thus activated.

The leads TB1–10 and STB1–10 are connected to the circuit indicated by IV. This circuit includes the contacts E1–20 and F1–20 and a two-coordinate second lock-out arrangement (not shown) connected to the leads STB1–10 and adapted to control the above contacts E1–20 and F1–20. This lock-out arrangement effects the control in such a manner that among the second signal wires TB1–10 at most two may be connected to the third signal wires *k*1–2 leading to the transmission circuits TC1–2 via a contact E1–20, and that a ground may be applied via contacts F1–20 to at most two of the third start leads *p*1–2 leading to the transmission circuits TC1 and TC2 respectively, each including a contact H1–2 and a contact I1–2. The third start leads *p*1–2 are connected to a third lock-out arrangement (not shown) which selects one of the transmission circuits of which the associated lead *p*1–2 is activated. This lock-out arrangement controls the contacts H1–2 and closes the contacts H1–2 of the transmission circuit selected, thus connecting the third signal wire *k*1–2 via contact H1–2 to a terminal G1–2. These terminals are connected to a common 20 kilocycles signal generator (not shown). The third lock-out arrangement also controls the contacts I1–2 and closes the contacts I1–2 of the transmission circuit selected, thus connecting receiving equipment thereof (not shown) via contact I1–2 and cable *m*1–2 to an identifier circuit IC. This identifier circuit is of a well known type and is adapted to identify any of the calling stations SC1–10,000 and to transmit this identity to any one of the transmission circuits TC1–2 via the cable *m*1–2. Each transmission circuit is finally adapted to transmit information to a distant message accounting or identifying center (not shown) via a cable *n*1–2 which permanently interconnects this transmission circuit TC1–2 and this identifying center.

The operation of the above described switching system is briefly as follows. A plurality of local calling connections are supposed to be established between pairs of subscriber stations of the group SC1–10,000 each via a first line finder 1LF, a second line finder 2LF, a cord circuit, a primary selector PS, a secondary selector SS and a final selector FS. In each of the cord circuits forming part of a connection for which a message accounting operation must be performed the cord circuit is connected to the associated first signal wire T1–360 and a ground is applied to the associated first start lead ST1–360 via a contact A1–360 and a contact B1–360 respectively. For instance it is supposed that, among others, the first cord circuit II shown is connected to first signal wire through contact A1, whereas the 360th cord circuit is connected to first signal wire T360 through contact A360, a ground being applied to first start leads ST1 and ST360 of these cord circuits through contacts B1 and B360 respectively.

Each first lock-out arrangement associated to a group of 36 cord circuits then determines the identity of one of the calling cord circuits in the group and accordingly connects this cord circuit to the associated second signal wire TB1–10 via a contact C1–360 and grounds the associated second start lead STB1–10 through a contact D1–10. It is assumed that the first and last or 360th cord circuits have thus been connected to the respective second signal wires TB1 and TB10 via contacts A1, C1 and A360, C360 respectively and that a ground has been applied to the respective second start leads STB1 and STB10 through contacts D1 and D10 respectively. It is also assumed that the two-coordinate lock-out circuit then operates in such a manner that it closes contacts E1, E20, F1 and F20. In this way the second signal wires TB1 and TB10 are connected to the third signal wires *k*1 and *k*2 respectively, whereas a ground is applied to third start leads *p*1 and *p*2 respectively. A partial loop is thus established between the identifier circuit and each of the transmission circuits TC1 and TC2.

The above third lock-out circuit then for instance selects the transmission circuit TC1 and accordingly closes the contacts H1 and I1. In this manner one of the above partial loops is completed and the above mentioned signal generator is connected to the third signal wire *k*1 so that a 20 kilocycles signal is applied to this wire. This signal reaches the identifier IC via the contacts E1, C1, A1, the cord circuit II, the second and first line finders 2LF and 1LF and the calling subscriber station. This calling subscriber station is thus identified in a well known manner and its identity is transmitted via cable *m*1 to the transmission circuit TC1 where it is received by receiving equipment via contact I1. When this identity has been correctly received in the transmission circuit TC1 the identifier IC and the circuits III and IV are released and the identity is transmitted to the distant accounting or identifying center via cable *n*1. When this information has been correctly received in the accounting center the transmission circuit TC1 is released. Immediately afterwards the message accounting for the 360th cord circuit is performed in the same way, since the transmission circuit TC2 will immediately apply a 20 kilocycles signal to third signal wire *k*2 and since the loop between this transmission circuit TC2 and the identifier IC will be completed by closing the respective contacts H2 and I2.

Principally referring to the FIGS. 2 to 6, the operation of the above automatic switching system is now described in detail hereinafter.

Figure 2:
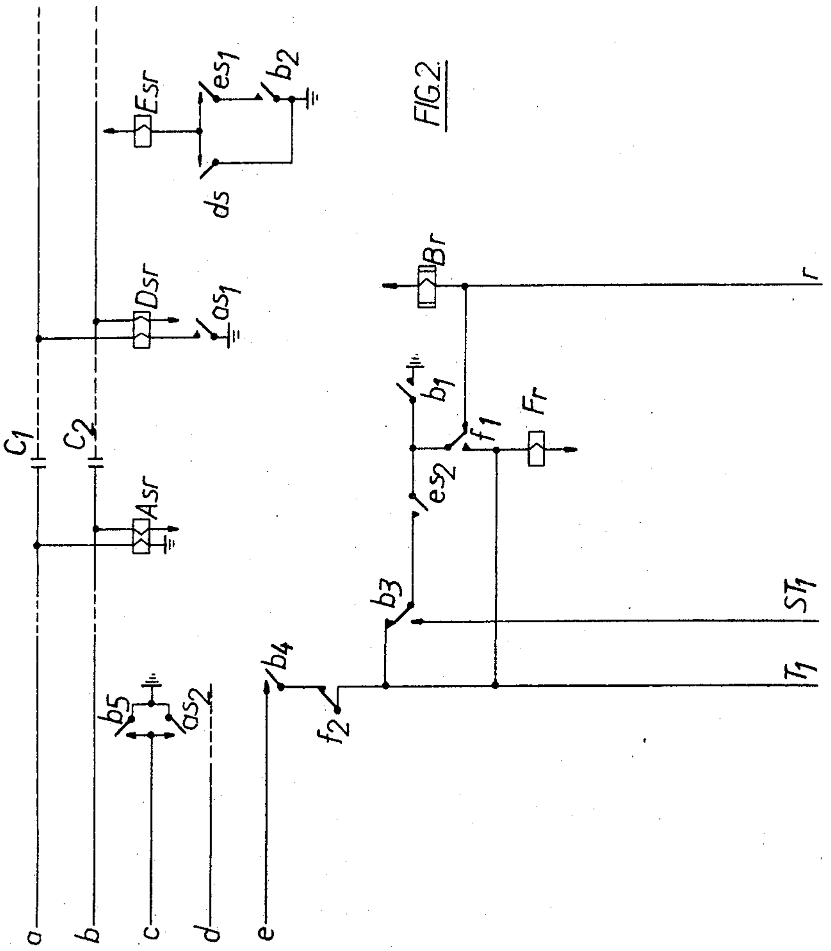
FIG. 2 is a detailed view of the cord circuit schematically represented in FIG. 1 and indicated by II.
Figure 3:
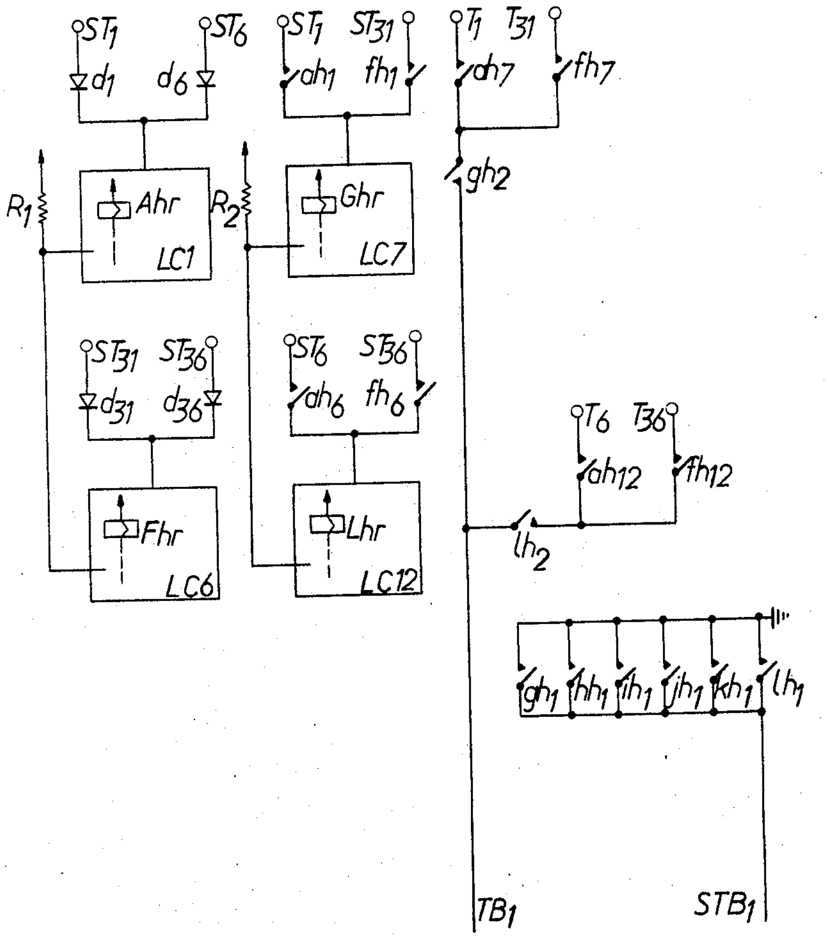
FIG. 3 is a detailed view of the circuit schematically represented in FIG. 1 and indicated by III.

When a subscriber lifts his handset its line is connected to a cord circuit, such as the one shown in FIG. 2, via a first and a second line finder, and this cord circuit is connected to a free register circuit (not shown). The relay A*sr* is energized through the *a* and *b* wires and the switch contact of the calling subscribers handset. By the closure of make contact *as*1 an operating circuit is prepared for relay D*sr*, whereas by the closure of make contact *as*2 wire *c* of the cord circuit is grounded. This ground will maintain established the connection of the cord circuit and the calling subscriber as long as the calling subscriber lifts his handset.

The digits of the called subscriber's number dialled by the calling subscriber are stored in the register wherein it is then decided, in a not shown but obvious manner, whether an accounting operation has to be performed or not. In case the call is a local one and when an identifying operation has to be performed, the slowly releasing relay B*r* is operated via a contact in this register and a wire *r* and locked as follows:

Battery, winding of relay B*r*, change-over contact *f*1 in its rest position, make contact *b*1 ground.

By the closure of make contact *b*1 a ground is connected to the junction point of contacts *es*2 and *f*1, whereas by the closure of make contact *b*2 a locking circuit is prepared for relay E*sr*. By the displacement of contact *b*3 make contact *es*2 is connected to start lead STI and by the closure of make contacts *b*4 and *b*5 wire *e* is connected to first signal wire T1, whereas wire *c* is again grounded. This signal wire T1 will be used to apply the 20 kilocycles signal to the calling subscriber's station via wire *e* in the first and second line finders whereas the ground on wire *c* will maintain established the connection of the cord circuit and this calling subscriber as long as the identifying operation is being performed. It should be noted that the series connected contacts *f*2 and *b*4 connecting the cord circuit to signal wire T1 correspond to the contact group indicated by A1 in FIG. 1.

After the cord circuit has been connected to the called subscriber and when the latter lifts his handset the relay D*sr* is energized, as follows: battery, right hand winding of relay D*sr*, wire *b*, the switch of the called subscriber's handset, wire *a*, left hand winding of relay D*sr*, make contact *as*1 of relay A*sr*, ground. Hence the operated relay D*sr* indicates that a calling connection has been established between two subscribers.

Due to the closure of make contact *ds* the relay E*sr* is energized. It is locked in the following circuit in order to memorize the fact that a calling connection has been established and that the calling subscriber must be identified: battery, winding of relay E*sr*, closed make contacts *es*1 and *b*2, ground.

A ground is connected to the first start lead ST1 of the cord circuit via the make contacts *b*1 and *es*2 and the changeover contact *b*3 in its work position, this group of contacts being the contact group indicated by B1 in FIG. 1.

It is assumed that in an analogous manner as described above the first signal wire T360 and the first start lead ST360 of the 360th cord circuit have been connected to the wire *e* of this cord circuit and to ground respectively.

The first start lead ST1 together with the other start leads of the group of 36 to which the first start lead ST1 belongs are each coupled to two lock-out circuits, one of the group LC1–6 and one of the group LC7–12 in the following manner: the groups of start leads ST1–6, ST7–12, ST13–18, ST19–24, ST25–30 and ST31–36 are connected via the decoupling diodes *d*1–36 to the lock-out circuits LC1 to LC6 respectively, and the 6 leads of each of these groups are moreover coupled to the lock-out circuits LC7–12 respectively via a make contact of a relay A*hr*–F*hr* included in the lock-out circuits LC1–6 respectively. These lock-out circuits LC1–6 are further also connected in parallel to a common battery via a test resistor R1 in such a manner that when one of the lock-out circuits LC1–6 is operated, i.e. when the relay A*hr*–F*hr* included therein is energized due to one of the 6 first start leads connected thereto being grounded, the potential at the lower end of the resistor R1 is decreased to such a value that the operation of the other lock-out circuits is prevented. In an analogous manner the lock-out circuits LC7–12 are connected in parallel to a common battery via a test resistor R2.

Hereby it should be noted that since the first start leads ST1–36 are coupled to the lock-out circuits LC7–12 through make contacts of the relays A*hr*–F*hr* included in the lock-out circuits LC1–6, a relay G*hr*–L*hr* included in the lockout circuits LC7–12 can only be operated when a lock-out circuit LC1–6 has been operated. In this manner one is sure that when a start lead is grounded only the lock-out circuits coupled to this lead will be operated.

The above lock-out circuits LC1–12 may for instance be of the type disclosed in the Belgian Patent 525,921 (P. Clemens 17) and are therefore not described in detail. It should be noted that these lock-out circuits LC1–12 together form the first lock-out arrangement, referred to in the above description of FIG. 1.

It may also be said that the lock-out circuit LC1–12 forms an identification circuit which includes a plurality of circuit LC1–12 subdivided in two different ways LC1–6 and LC7–12. The bistate devices or relays A*hr*–L*hr* operable in response to one or more of said circuits are in a calling condition to characterize one particular calling circuit. Hereby two sets of bistate devices or relays A*hr*–F*hr* and G*hr*–L*hr* are provided for each subdivision into groups and the bistate devices or relays A*hr*–F*hr*, G*hr*–L*hr* pertaining to different sets are operated one after the other. It should be noted that such an identification circuit is already known from the Dutch Patent No. 88,148 (A. Adelaar-F. De Wit 23–1). In the present identification circuit the bistate devices of a same set are, however, simultaneously driven toward the condition characterizing a calling circuit since they are arranged in a parallel lock-out circuit. Moreover, the bistate devices or relays of the sets A*hr*–F*hr*, G*hr*–L*hr* are driven from one set to the next through contacts *ah*1–6 to *fh*1–6 of the relays.

It is supposed that due to the first start lead ST1 being activated, eventually together with other start leads of the group ST2–36, the lock-out circuit LC1 is operated due to which relay A*hr* is energized. By the closure of make contact *ah*1 of relay A*hr* the lock-out circuit LC7 is operated, due to which the relay G*hr* is energized. Both the operated relays A*hr* and G*hr* identify the calling cord circuit II.

By the closure of make contact *gh*1 a ground is applied to the second start lead STB1, the contact *g*1 corresponding to the contact D1 of FIG. 1.

By the closure of make contacts *ah*7 and *gh*2, the first signal wire T1 is connected to the second signal wire TB1, both these contacts corresponding to the contact group C1 of FIG. 1.

It is supposed that in an analogous manner as described above the calling 360th cord circuit has been identified and that consequently the second start lead STB10 has been grounded and the first signal wire T360 has been connected to the second signal wire TB10.

Figure 4:
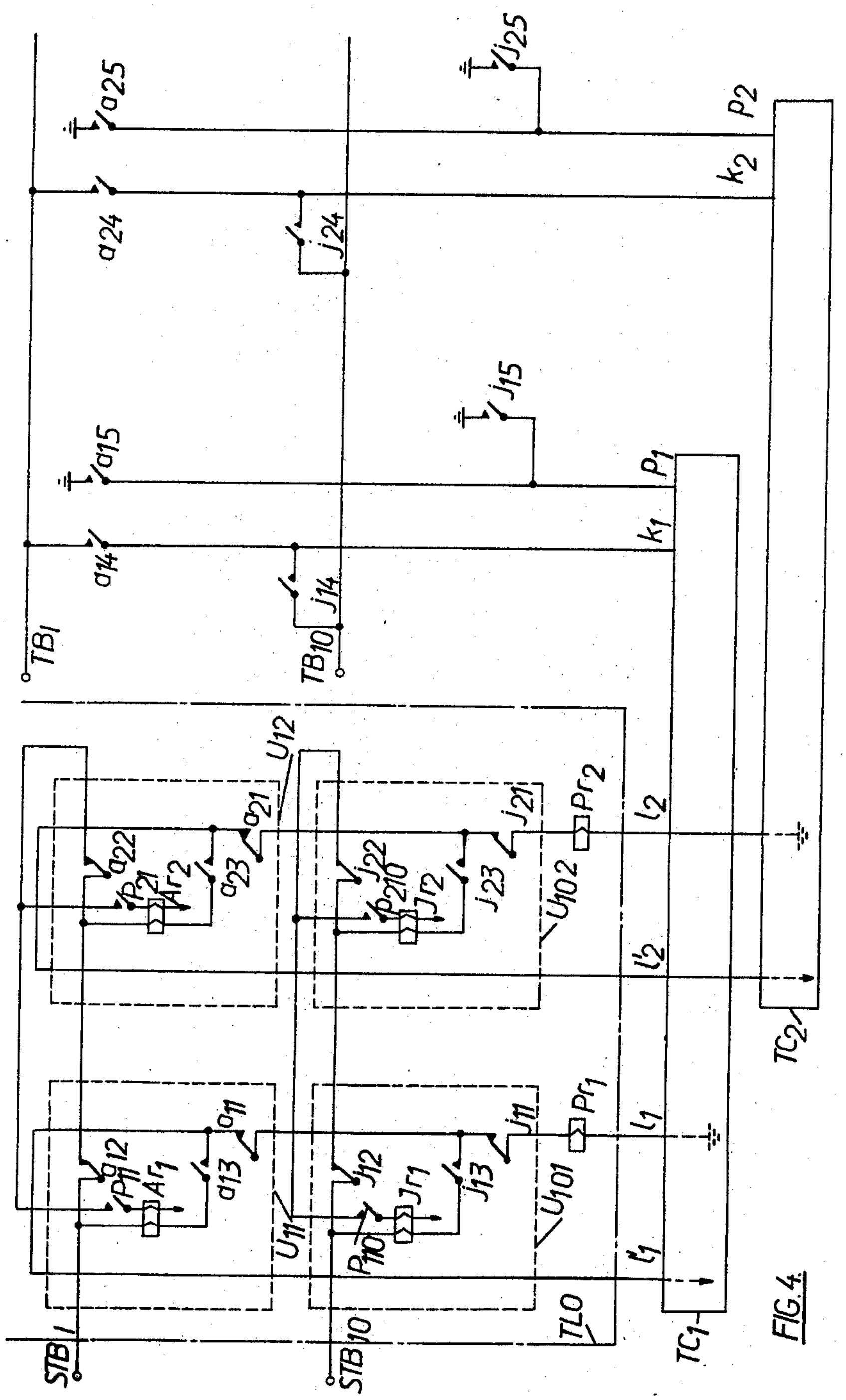
FIG. 4 is a detailed view of the circuit schematically represented in FIG. 1 and indicated by IV.

Principally referring to FIG. 4, the second start leads STB1–10 are connected to the two-coordinate second lock-out arrangement TLO, whereas the second signal wires TB1–10 are coupled to the transmission circuits TC1–2 through make contacts *a*14, *a*24 to *j*14, *j*24. This lock-out arrangement includes 20 identical circuit units U11 to U102, the first one or first two digits indicating the row and the last digit indicating the column to which the circuit unit belongs. Each circuit unit includes merely one relay, with two windings and three contacts, and a make contact pertaining to a common relay associated to the column. For instance circuit unit U11 includes relay A*r*1 with two windings, two break contacts *a*11 and *a*12 and a make-before-break contact *a*13, and further a make contact *p*11 of the common relay P*r*1 associated to the first column.

The first break contacts of the relays included in the 10 circuit units of a same column are connected in series with the winding of the common relay associated to this column between a ground and a battery both provided by the transmission circuit associated to this column. For instance, the 10 first break contacts *a*11 and *j*11 are connected in series with common relay P*r*1 between a ground and a battery provided by transmission circuit TC1. The second break contacts of the relays included in the two circuit units of a same row are connected in series between second start lead STB1–10 and two parallel connected circuits each consisting of a battery, the right hand winding of the relay included in the corresponding circuit unit, and a make contact of the common relay associated to the column to which this circuit unit belongs. For instance, the second break contacts *a*12 and *a*22 are connected in series between second start lead STB1 and two parallel connected circuits, the first consisting of a battery, the right hand winding of relay A*r*1 and a make contact *p*11 of the common relay P*r*1, and the second consisting of a battery, the right hand winding of relay A*r*2 and a make contact *p*21 of the common relay P*r*2. Finally, the left hand winding of the relay included in each circuit unit is connected in series with its make-before-break contact between the junction points of, on the one hand, the second break contact of this relay and that of the relay included in the lower numbered circuit unit of the row to which the unit considered belongs and, on the other hand, the first break contact of this relay and that of the relay included in the lower numbered circuit of the column to which the unit considered belongs. For instance, the left hand winding of the relay J*r*2 of circuit unit U102 is connected in series with its make-before-break contact *j*23 between the junction points of, on the one hand, its second break contact *j*22 and the second break contact *j*12 of circuit unit U101 and, on the other hand, its first break contact *j*21 and the first break contact *i*21 of circuit unit U92.

A relay included in one of the circuit units U11 to U102 can only be energized in the following circuit:

Ground on second start lead STB1–10 associated to the row of this circuit unit, closed series connected first break contacts of the relays included in the two circuit units of this row, closed make contact of the common relay associated to the column of this circuit unit, right hand winding of the relay included in this circuit unit, battery. Hence this relay can only be energized when all the relays of the circuit units of the row are not operated and when simultaneously the common relay of the column is operated i.e. when simultaneously all the relays of the circuit units of this column are not operated, supposing that a ground and a battery is provided by the transmission circuit associated to the column. This means that of the 20 relays A*r*1 to J*r*1 and A*r*2 to J*r*2 no two having a common coordinate can be simultaneously operated, but other can be operated, and that the priority of operation is from left to right and from above to below.

It is supposed that the transmission circuits TC1 and TC2 are free, i.e. that they provide a ground and a battery to the leads *l*1–2 and *l'*1–2 respectively, and that none of the circuit units U11 to U102 is operated.

Relays A*r*1 and J*r*2 are then operated in the following circuits, when as supposed above a ground is present on the second start leads STB1 and STB10:

Ground on lead STB1, series connected first break contacts *a*12 and *a*22, make contact *p*11 of common relay P1*r*, right hand winding of relay A*r*1, battery, and ground on lead STB10, series connected first break contacts *j*12 and *j*22, make contact *p*210 of common relay P*r*2, right hand winding of relay J*r*2, battery.

By the closure of make-before-break contact *a*13 the second start lead STB1 is connected to the junction point of first break contact all and lead *l'*1 via left hand winding of relay A*r*1 and closed make contact *a*13, whereas by the closure of make-before-break contact *j*23 the second start lead STB10 is connected to the junction point of first break contacts *j*21 and *i*21 (not shown) via left hand winding of relay A*r*1 and closed make contact *j*23.

These relays A*r*1 and J*r*2 are however not locked since the above junction points are as well connected to ground as to a battery.

But when the first break contacts *a*11 and *j*21 are opened the ground is removed from these junction points and the relays A*r*1 and J*r*2 are locked as follows:

Ground on lead STB1, left hand winding of relay A*r*1, make contact *a*13, lead *l'*1 to battery, and ground on lead STB10, left hand winding of relay J*r*2, make contact *j*23, first break contacts *i*21 to *a*21, lead *l'*2, battery.

By the opening of the first break contacts *a*11 and *j*22 the operating circuits of relays P*r*1 and P*r*2 are opened, thus releasing other relays of the first and second column which were eventually energized together with A*r*1 and J*r*2 and preventing such relays from remaining operated.

It should be noted that if the contacts of each of the groups *a*12–*a*22 . . . *j*12–*j*22 would have been connected in a preference circuit, a correct operation would have been impossible. Indeed, when it is supposed that relays A*r*2 and J*r*1 are operated and that such preference circuits exist, then the removal of the ground from lead STB10 will not only release relay J*r*1, but will also operate relay P*r*1 due to which contact *p*11 is closed and relay A*r*1 is energized so that relay A*r*2 is released. In the circuit of FIG. 4 this is impossible since the closure of contact *p*11 does not modify the operated condition of relay A*r*2.

By the closure of make contact *a*14 the second signal wire TB1 is connected to transmission circuit TC1 via third signal wire *k*1, whereas the closure of make contact *a*15 a ground is applied to this transmission circuit via the third start lead *p*1. By the closure of make contact *j*25 the second signal wire TB10 is connected to transmission circuit TC2 via third signal wire *k*2, whereas by the closure of make contact *j*25 a ground is applied to this transmission circuit via third start lead *p*2. It should be noted that the contacts *a*14, *a*24–*j*14, *j*15 and *a*15, *a*25–*j*15, *j*25 correspond to the contacts E1–20 and F1–20 represented in FIG. 1.

The above lock-out circuit TLO is of the type disclosed in the Belgian Patent No. 647,018 (A. Henquet et al. 53–1–1). Indeed, it comprises a plurality of relays, such as A*r*1–2, J*r*1–2, and such that no set of two relays having a common coordinate can constitute a stable operated combination. Each set of relays (A*r*1–J*r*1, A*r*2–J*r*2), associated with a same coordinate in one direction, i.e. the vertical direction, has a locking circuit and is associated with a common relay (P*r*1, P*r*2) which is so connected that it changes its condition subsequently to the operation of any associated relay, thereby disabling the operating circuits of the associated relays, only one of which is held operated through the locking circuit constituted by a priority chain formed by the series connected contacts (*a*11–*j*11, *a*21–*j*21) of the relays associated in the one direction. The relays having the same coordinate in the other direction, i.e. the horizontal direction, are operated through other contacts (*a*12–*a*22, *j*12–*j*22) of the other relays having the same coordinate in the other direction. As already explained above, on the present lock-out circuit each common relay (P*r*1, P*r*2) is, however, normally operated through said locking circuits the contacts (*a*11–*j*11, *a*21–*j*21) of which are break contacts and each common relay releases subsequently to the operation of any associated relay. Moreover, the relays having the same coordinate in said other direction are operated through a common chain (*a*12–*a*22, *j*12–*j*22) formed by a series connected break contacts of the relays (A*r*1, A*r*2) having the same coordinate in the other direction and through an individual make contact (*p*11–*p*21, *p*110–*p*210) of the common relay.

It the above it has been mentioned that the common relay associated to a column is energized when none of the relays included in the circuit units of this column is operated, via a battery and a ground provided in the transmission circuit associated to this column when this transmission circuit is free.

Figure 5:
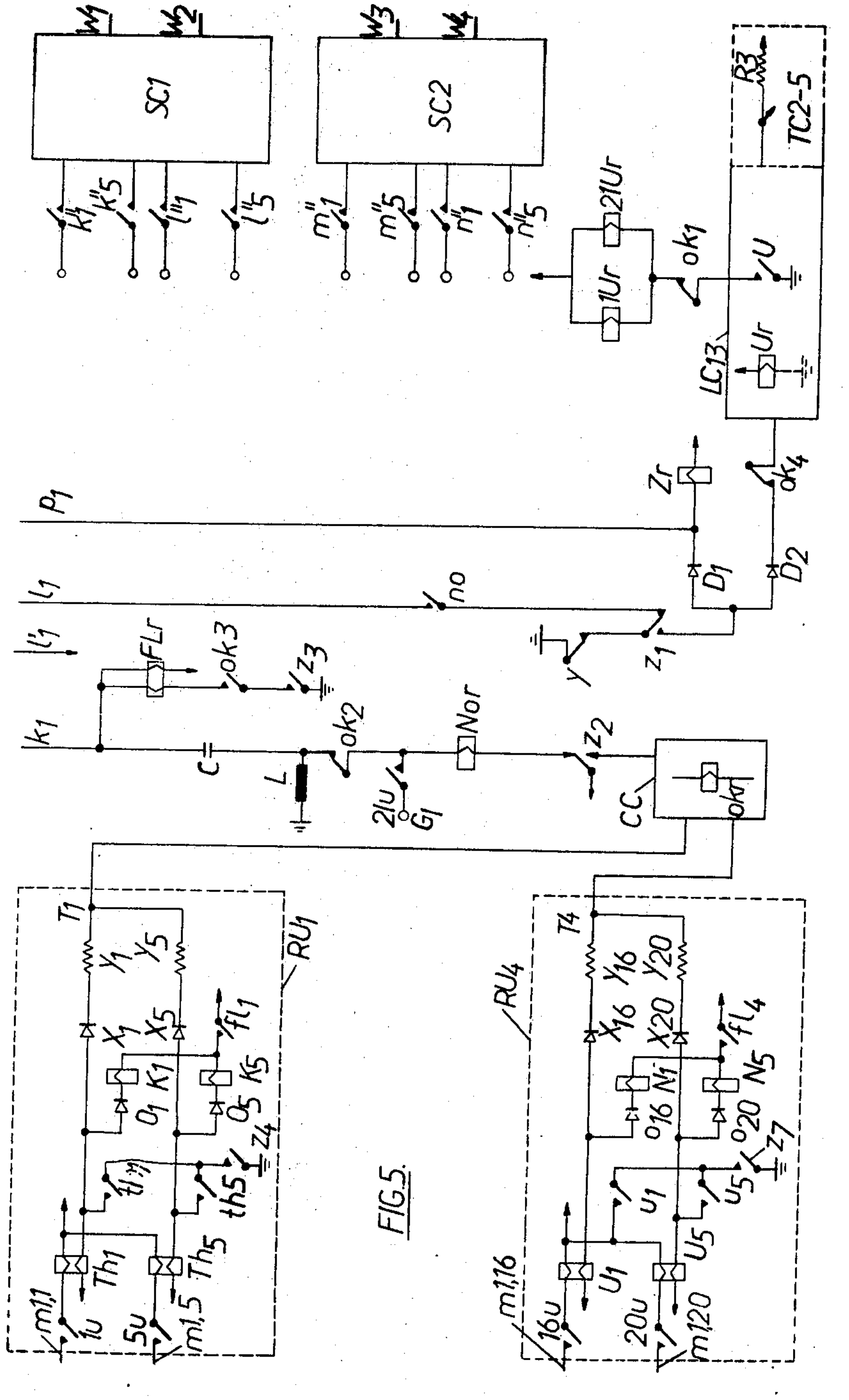
FIG. 5 is a detailed view of a transmission circuit represented in FIG. 1 and indicated by TC1.

Referring to FIG. 5 showing the transmission circuit TC1, the latter is free when the relay N*or* is energized in the following circuit: battery, change-over contact *z*2 in its rest position, winding of relay N*or*, break contact *ok*2, inductance L, ground. A ground is then connected to the above mentioned lead *l*1 via break contact *y*, change-over contact *z*1 in its rest position and make contact *no*, the above mentioned lead *l'*1 is permanently connected to a battery. If the transmission circuit TC2 is free lead 12 is grounded in an analogous manner and lead *l'*2 is permanently connected to a battery.

Only transmission circuit TC1 is now considered further, the operation of transmission circuit TC2 being analogous to that of TC1.

The third signal wire *k*1 is connected to the junction point of the oppositely wound windings of relay F*lr* and to the capacitor C. The grounded third start lead *p*1 is connected to the winding of relay Z*r* due to which this relay Z*r* is energized. The relay Z*r* is locked to ground via a diode D1, change-over contact *z*1 in its work position and the above break contact *y* which is only temporarily opened when an acknowledgement signal is received from the accounting or identifying center that information has been correctly received, as will be explained later. By the displacement of change-over contact *z*2 battery is removed from the winding of relay N*or* due to which the latter relay is released thus indicating that the transmisison circuit TC1 is occupied. This battery is connected to the check circuit CC which is thus prepared for operation.

The ground applied to the winding of relay Z*r* is also applied via a diode D2 and contact *ok*4 to the lock-out circuit LC–13 which is of the same type as the lock-out circuits LC1–12. In an analogous manner a ground is also applied to a corresponding lock-out circuit included in the transmission circuit TC2. Both these lock-out circuits are connected to a same test battery via a common resistor R3 in such a manner that only one of these lock-out circuits is operated. It is supposed that the lock-out circuit LC13 of TC1 is operated, due to which the relay U*r* included in this circuit is energized.

The reed relays 1U*r*, to 21U*r* are then operated in the following circuit: battery, winding of relays 1U*r* to 21U*r* in parallel, break contact *ok*1, make contact *u* of U*r*, ground.

By the closure of the make contacts 1*u* to 20*u* of the reed relays 1U*r* to 20U*r* the five input leads *m*1, 1–1, 5 . . . , *m*1, 6–1, 20 of each of the receiving units are connected to the one ends of the first winding of the five relays T*h*1–5, H1–5, T1–5, U1–5 included in this unit, the other ends of these windings being connected to a common battery. The five relays of the units RU1–4 are intended to receive the thousands, hundreds, tens and units digits from the identifier circuit IC. Only the relays T*h*1 and T*h*5 of unit RU1 and U1 and U5 of unit RU4 are represented.

It should be noted that the input leads *m*1, 1 to *m*1, 20 are included in the cable *m*1 of FIG. 1 and that the make contacts 1*u* to 20*u* form the contact I1 shown in the same figure.

By the closure of make contact 21*u* of reed relay 21U*r* the 20 kilocycles signal generator is connected to the junction point of the winding of relay N*or* and contact *ok*2. Consequently this signal is transmitted to the identifier circuit IC of FIG. 1 in the following circuit: terminal G1, make contact 21*u*, break contact *ok*2, capacitor C, third signal wire *k*1, make contact *a*14, second signal wire TB1, make contacts *gh*2 and *ah*7, first signal wire T1, break contact *f*2, make contact *b*4, wire *e* in the second and first line finders 2LF and ILF, calling subscriber station, identifier circuit IC.

It should be noted that the inductance L prevents this 20 kilocycle signal from being grounded and that contact 21*u* is the contact H1 of FIG. 1.

In this identifier circuit IC the identification of the calling line takes place in a classical way which is therefore not described in detail. Four digits of the calling line number are then transferred in a 2-out-of-5 code from this identifier circuit IC to the transmission circuit TC1 over the cable *m*1, where they are received via the input leads *m*1, 1–1, 20 on the receiving relays T*h*1–5, H1–5, T1–5, U1–5 of receiving units RU1 to RU4.

The eight operated relays of these units are each locked via their second winding, an own make contact *th*1–5 . . . , *u*1–5 and a common ground provided through a make contact *z*4–7 of relay Z*r*.

The second windings of the five relays included in each receiving unit RU1–4 are also connected to a common output terminal T1–4 via a diode X1–20 and a resistor Y1–20. These output terminals T1–4 are each coupled to a well known check circuit CC which is able to check if 2 relays out of 5 have been energized in each receiving unit RU1–4. If this is found to be correct the relay O*kr* is operated therein.

Consequently the reed relays 1U*r* to 21U*r* are released by the opening of break contact *ok*1, whereas the signal generator is disconnected from the third signal wire *k*1 by the opening of break contact *ok*2.

By the opening of break contact *ok*4 the lock-out circuit LC13 is released so that relay U*r* is de-energized.

By the opening of make contacts 1*u* to 20*u* the transmission circuit TC1 is disconnected from the identifier circuit IC, whereas by the opening of make contacts 21*u* the 20 kilocycle generator is disconnected from the winding of relay N*or*. By the closure of make contact *ok*3 the following circuit is established: ground, make contacts *z*3, and *ok*3, left hand winding of relay F*lr*, third signal wire *k*1, make contact *a*14, second signal wire TB1, make contacts *gh*2, *ah*7, first signal wire T1, winding of relay F*r*, battery. Due to this relay F*r* is energized, thus indicating in the cord circuit seized that the calling subscriber's number has been correctly received in the transmission circuit. By the opening of break contact *f*2 wires *e* and T1 are disconnected from each other, whereas by the displacement of change-over contact *f*1 the locking circuit of relay B*r* is opened due to which this relay starts releasing. Relay B*r* is, however, slowly releasing and during the time it is still operated a ground is applied to the winding of relay F*r* and to first signal wire T1 via closed make contact *b*1 and the change-over contact *f*1 in its work position. Due to this relay F*r* is maintained energized and the junction point of the oppositely wound windings of relay F*lr* in TC1 is grounded. Consequently the left hand winding is short-circuited and relay F*lr* is energized as follows: battery, right hand winding of relay F*lr*, ground on the above junction point.

It should be noted that capacitor C prevents the ground applied to first signal wire *k*1 from reaching the winding of relay N*or*.

When relay B*r* has completely released in the cord circuit the ground is removed from first signal wire T1 by opening of make contact *b*1. By the opening of make contact *b*2 of relay B*r* relay E*sr* may release and by the opening of make contact *b*5 ground is removed from wire *e*, so that the connection between the cord circuit and the calling subscriber is released, when relay A*sr* is already de-energized, or will be released when the calling subscriber hooks his handset, relay A*sr* being de-energized at that moment.

During the time relay F*lr* is energized the following happens. Eight of the twenty auxiliary reed relays K1–5, L1–5, M1–5, N1–5 included in the receiving units RU1–4 and corresponding to the operated main relays, are then energized via a ground provided through one of the make contacts *z*4–7, one of the contacts *th*1–5, . . ., *u*1–5, a diode O1–O20, their winding, a make contact *fl*1–4 and a battery. Only two groups K1–5 and N1–5 of auxiliary relays have been shown. By the closure of the make contacts of these operated reed relays four particular frequencies are then simultaneously applied to each of the sending circuits SC1 or SC2 and from there over the wires *w*1–2 and *w*3–4 to the distant accounting center. For instance the reed relays K1–5 and L1–5 (not shown) included in the receiving units RU1–2 are able to apply the following frequencies to the sending circuit SC1 by the closure of their contacts *k*″1–5 and *l*″1–5. 1380 c.p.s., 1500 c.p.s., 1620 c.p.s., 1740 c.p.s., 1860 c.p.s., 1140 c.p.s., 1020 c.p.s., 900 c.p.s., 780 c.p.s., 660 c.p.s. In the same manner the reed relays M1–5 (not shown) and N1–5 included in the receiving units RU3–4 are able to apply the same frequencies to the sending circuit SC2 by the closure of their contacts *m*″1–5 and *n*″1–5.

When these frequency signals are correctly received in the accounting center of *ok* signals is sent back to the transmission circuit TC1 due to which the break contact *y* is temporoarly opened. It should be noted that the eight received frequencies determine four digits of the calling subscriber's number, the two other ones being determined by the identity of the incoming junction in the accounting center.

By the opening of contact *y* the operating ground is removed from relay Z*r*, due to which this relay Z*r* is released. By the displacement of change-over contact *z*1 the winding of relay Z*r* is definitively disconnected from contact *y*. By the displacement of change-over contact *z*2 an operating circuit is prepared for relay N*or* and battery is removed from check circuit CC due to which relay O*kr* is released. By the opening of make contact *z*3 ground is removed from the left hand winding of relay F*lr* and from third signal wire *k*1, due to which relay F*lr* is released. By the opening of make contacts *z*4–7 the operated main and auxiliary relays of the receiving units RU1–4 are released and the operating potentials are removed from the terminals T1–4 due to which the signal frequencies are removed from the wires *w*1–4. The relay N*or* indicating the availability of the circuit is then again energized via change-over contact *z*2 in its rest position, break contact *ok*2 and inductance L.

The transmission circuit TC1 is now ready for another operation. It should however be noted that as soon as relay U*r* has released, the test potential at the resistance R3 will have increased to a value enabling the operation of the corresponding U*r* relay in the transmission circuit TC2. In the same manner as described above an identification operation is then performed, practically immediately after the preceding one is finished since the U*r* relay of this transmission circuit TC2 has only to operate the relays 1U*r* to 2U*r* thereof in order to connect the transmission circuit TC2 to the identifier circuit IC and to connect an identifying 20 kilocycles signal to the corresponding third signal wire, the connecting of the transmission circuit TC2 and the calling subscriber station being already established.

Again referring to FIG. 1, but now to the right hand part thereof, there is shown the apparatus adapted to the message accounting of toll calls, and more particularly in the identifying operation of the calling station engaged in such a call. In this case the register R, connected to a calling cord circuit via a register finder RF, searches for a transmission circuit among the group TC3–5 via the finder TCS. This transmission circuit then sends a 20 kilocycles signal to the identifier circuit IC and is connected to this identifier circuit from which it receives the identity. Afterwards this identity is transmitted to the distant accounting or identifying center via the finder TCS, the register R, the register finder RF and the part of the connection, between the register finder RF and the called station, leading to this accounting center. The transmission circuits TC3–5 each include a lock-out circuit LC13, such as the ones included in the transmission circuits TC1–2, and the lock-out circuits LC13 of the transmission circuits TC1–5 are all connected to the common resistor R3 in order to prevent two or more transmission circuits TC1–5 from being operated simultaneously.

The above described system may also be adapted to be used in case of multi-metering by placing a meter in each cord circuit, this meter replacing the individual meters normally included in the line circuits of the subscribers. In this case it would for instance be possible to proceed in the following two ways. According to a first solution the identifying operation and the reading of the contents of the meter are both performed at the end of a conversation between two subscribers and both these information are simultaneously transmitted to the accounting center. According to a second solution the identifying operation is performed after a calling connection has been established, and the identity of the calling subscriber as well as that of the cord circuit used are simultaneously transmitted to the accounting center. At the end of the conversation the contents of the counter are read and this information together with identity of the cord circuit are simultaneously transmitted to the accounting center. In the latter center it is then possible to associate the contents of the counter and the identity of the calling subscriber due to these information being each associated with a same cord circuit identity.

While the principles of the invention have been described above in connection with specific apparatus, it is to be clearly understood that this description is made only by way of example and not as a limitation on the scope of the invention.

What is claimed is:

1. An automatic telecommunication switching system comprising subscriber stations, automatic switching means for establishing connections between calling and called stations, at least one identifier circuit capable of generating an identifying signal for any calling station and of storing the identity of this calling station, connection means capable of establishing a closed identifying loop including said identifier circuit and part of a connection established by said switching means and leading to a calling station and of connecting said generating means to said loop in order to perform an identifying operation, transmission means for transmitting the identity stored in said identifier circuit after such an operation to an identifying center, means distinct from said connections between calling and called stations for connecting said transmission means to said identifying center, said transmission means including a plurality of transmission circuits each permanently connected to said identifying center and said connection means including lock-out means to prevent more than one of said loops from being simultaneously established.

2. An automatic telecommunication switching system according to claim 1, in which lock-out means include a two-coordinate lock-out relay circuit comprising a plurality of sets of relays, each set of relays associated with a same coordinate in one direction including a locking circuit associated with a common relay which is connected to change its condition subsequently to the operation of any associated relay, and thereby disable the operating circuits of said associated relay.

3. An automatic telecommunication switching system according to claim 2, in which the two-coordinate lock-out circuit is characterized in that relays having the same coordinate in another direction are operated through a common chain formed by series connected second contacts which are break contacts of the relays having said same coordinate in said one direction and through an individual make contact of said common relay.

4. An automatic telecommunication switching system according to claim 1, characterized in that said connecting means are able to establish a closed loop including a said transmission circuit, capable of being connected to said generating means, by connecting said transmission circuit, on the one hand, to the end of said partial connection away from said calling station and, on the other hand, to said identifier circuit.

5. An automatic telecommunication switching system according to claim 4, characterized in that said connecting means are able to simultaneously establish a plurality of partial loops each including a said transmission circuit, a said partial connection and said identifier circuit and are able to complete each partially established loop one at a time by interconnecting said identifier circuit and the transmission circuit included in this partially established loop.

6. An automatic telecommunication switching system according to claim 5, characterized in that said connecting means include first connecting elements formed by single contact reed relays, adapted to complete a said partially established loop at a speed which is substantially higher than that at which second connecting elements included in said connecting means establish such a partial loop.

7. An automatic telecommunication switching system according to claim 4, characterized in that said connecting means are capable of simultaneously connecting ends of partial connections away from said calling stations, each to a different one of said transmission circuits.

8. An automatic telecommunication switching system according to claim 7, characterized in that said lock-out means included in said connecting means include a two-coordinate first lock-out circuit and that the ends of said partial connections away from said calling stations, and in a said group from being connected to said two-coordiordinate first lock-out circuit comprising a plurality of bistate devices and such that no set of two bistate devices having a common coordinate can constitute a stable operated combination, thus preventing a said end to be connected to more than one said transmission circuit and vice-versa.

9. An automatic telecommunication switching system according to claim 8, characterized in that the ends of said partial connections away from said calling stations are distributed over a plurality of groups and that for each group said lock-out means include a second lock-out circuit preventing more than one of the ends included in a said group from being connected to said two-coordinate first lock-out circuit.

10. An automatic telecommunication switching system according to claim 9, in which said lock-out means included in said connecting means include a third lock-out circuit controlling the connection between said transmission circuits and said identifier circuit in order to prevent more than one transmission circuit from being connected to said identifier circuit.

11. An automatic telecommunication switching system according to claim 10, in which the ends of said partial connections away from said calling stations are each constituted by a cord circuit.

12. An automatic telecommunication switching system according to claim 11, in which each said cord circuit includes switching means for starting said identification and which are operated upon a called station answering a call, but which keep said cord circuit busy to complete said identification irrespective of the release of either the calling or the called stations.

13. An automatic telecommunication switching system according to claim 12, in which each of said cord circuit switching means includes a first relay able to be connected to a register and to be energized when a calling station has to be identified, said first relay maintaining established the connection between said cord circuit and a calling station, a second relay which is operated when a connection has been established between two stations and when said first relay is energized and a third relay which is operated when an identifying operation has been performed and which then releases said first relay and consequently said second relay.

14. An automatic telecommunication switching system according to claim 13, including two transmission circuits.

15. An automatic telecommunication switching system according to claim 14, in which said identifying operation is performed for local calls.

16. An automatic telecommunication switching system according to claim 15 including means for identifying toll calls by establishing identifying loops including second transmission circuits and said third lock-out circuit prevents more than one of the first transmission circuits, used for identifying local calls, and of said second transmission circuits from being connected to said identifier circuit.

References Cited

UNITED STATES PATENTS 3,062,918 11/1962 Williford.
3,267,216 8/1966 Raab et al.

WILLIAM C. COOPER, Primary Examiner